US012285043B1

(12) United States Patent
Lu

(10) Patent No.: US 12,285,043 B1
(45) Date of Patent: Apr. 29, 2025

(54) INTELLIGENT TEMPERATURE-CONTROLLED HOOKAH SET

(71) Applicant: Hao Lu, Shenzhen (CN)

(72) Inventor: Hao Lu, Shenzhen (CN)

( * ) Notice: Subject to any disclaimer, the term of this patent is extended or adjusted under 35 U.S.C. 154(b) by 0 days.

(21) Appl. No.: 18/732,670

(22) Filed: Jun. 4, 2024

(30) Foreign Application Priority Data

Mar. 22, 2024 (CN) ........................ 202420575923.9

(51) Int. Cl.

| | |
|---|---|
| ***A24F 1/30*** | (2006.01) |
| ***A24F 5/00*** | (2006.01) |
| ***A24F 40/20*** | (2020.01) |
| ***A24F 40/46*** | (2020.01) |
| ***A24F 40/485*** | (2020.01) |
| ***A24F 40/51*** | (2020.01) |
| ***A24F 40/57*** | (2020.01) |
| ***A24F 40/60*** | (2020.01) |
| ***A24F 40/65*** | (2020.01) |
| ***H05B 3/26*** | (2006.01) |

(52) U.S. Cl.

CPC .................. *A24F 1/30* (2013.01); *A24F 5/00* (2013.01); *A24F 40/20* (2020.01); *A24F 40/46* (2020.01); *A24F 40/485* (2020.01); *A24F 40/51* (2020.01); *A24F 40/57* (2020.01); *A24F 40/60* (2020.01); *A24F 40/65* (2020.01); *H05B 3/26* (2013.01)

(58) Field of Classification Search

None

See application file for complete search history.

(56) References Cited

U.S. PATENT DOCUMENTS

2006/0272658 A1* 12/2006 Mehio ...................... A24F 1/30 131/173
2016/0066619 A1* 3/2016 Di Carlo ................. A24F 40/50 131/329
2017/0066555 A1* 3/2017 Baldo .................... B65D 1/023
2019/0307171 A1* 10/2019 Kane ........................ H05B 3/46
2021/0259315 A1* 8/2021 Lin ......................... A24F 40/42
2021/0321662 A1* 10/2021 Emmett .................... A24F 1/30
2021/0401061 A1* 12/2021 Davis ...................... A24F 40/57

* cited by examiner

*Primary Examiner* — Katherine A Will

(74) *Attorney, Agent, or Firm* — WPAT, PC

(57) ABSTRACT

An intelligent temperature-controlled hookah set includes a hookah body, a bottom of the hookah body is provided with a water tank, a top of the hookah body is provided with a tobacco bowl, the water tank is inserted with a smoke pipe extending upward, a bottom of the tobacco bowl defines a through hole connected to an upper end opening of the smoke pipe, the hookah body is provided with a three-dimensional electric heating component therein configured to heat the tobacco bowl, and the hookah body is provided with a temperature sensor therein configured to monitor a temperature of the tobacco bowl.

18 Claims, 6 Drawing Sheets

A–A

B

INTELLIGENT TEMPERATURE-CONTROLLED HOOKAH SET

CROSS-REFERENCE TO RELATED APPLICATION

This application claims priority to Chinese Patent Application No. 202420575923.9, filed Mar. 22, 2024, which is herein incorporated by reference in its entirety.

TECHNICAL FIELD

The disclosure relates to the field of hookah sets, and more particularly to an intelligent temperature-controlled hookah set.

BACKGROUND

Hookah sets in the related art mainly heat tobacco bowls by burning charcoal, and use heat generated by charcoal burning to produce smoke from tobacco. This heating method in the related art has following three problems.

1. The charcoal produces carbon monoxide during the charcoal burning, and inhaling excessive amounts of the carbon monoxide in a short time can lead to carbon monoxide poisoning for users. Meanwhile, the carbon monoxide can also cause environment pollution.
2. Time of the charcoal burning is limited, and the charcoal may need to be added or replaced multiple times during a single use, which is extremely inconvenient.
3. The charcoal burning is difficult to control, therefore, heating temperature cannot be precisely controlled, which can easily lead to overheating or insufficient heating of the tobacco, thereby affecting flavor of the tobacco.

Therefore, how to overcome above shortcomings becomes an important issue that those skilled in the art urgently need to solve.

SUMMARY

The disclosure solves above problems and provides an intelligent temperature-controlled hookah set.

To achieve above purposes, the disclosure uses following technical solutions.

The intelligent temperature-controlled hookah set includes a hookah body. A bottom of the hookah body is provided with a water tank, a top of the hookah body is provided with a tobacco bowl, the water tank is inserted with a smoke pipe extending upward, a bottom of the tobacco bowl defines a through hole connected to an upper end opening of the smoke pipe, the hookah body is provided with a three-dimensional electric heating component therein configured to heat the tobacco bowl, and the hookah body is provided with a temperature sensor therein configured to monitor a temperature of the tobacco bowl.

In an embodiment, the three-dimensional electric heating component includes a heating sheet disposed around side walls of the tobacco bowl and a heating body disposed above the tobacco bowl.

In an embodiment, heating power of the heating body is dynamically adjusted in a range of 0 watt (W) to 200 W.

In an embodiment, the heating body is one of a heating wire, a heating tube, and a heating sheet.

In an embodiment, the hookah body is provided with a power component therein between the water tank and the tobacco bowl, and the power component is configured to supply power to the intelligent temperature-controlled hookah set.

In an embodiment, the power supply component is sleeved on a section of the smoke pipe between the tobacco bowl and the water tank.

In an embodiment, the power supply component is installed with rechargeable batteries (61) therein which are detachable.

In an embodiment, the intelligent temperature-controlled hookah set further includes a power supply base configured to place the hookah body on the power supply base and supply power to the hookah body.

In an embodiment, a side wall of the hookah body defines an inhalation channel connected to the water tank, and a position of the inhalation channel is higher than a lower end opening of the smoke pipe.

In an embodiment, the hookah body is provided with an airflow sensor at the inhalation channel, and the airflow sensor is configured to sense airflow changes.

In an embodiment, the airflow sensor is disposed at an end of the inhalation channel close to the water tank.

In an embodiment, the side wall of the hookah body is provided with a display screen configured to display heating power of the three-dimensional electric heating component and the temperature of the tobacco bowl, and the side wall of the hookah body is further provided with operation buttons configured to adjust the heating power of the three-dimensional electric heating component and the temperature of the tobacco bowl.

In an embodiment, the hookah body is provided with a near field communication (NFC) reader module therein configured to activate the intelligent temperature-controlled hookah set and obtain a control permission. The NFC reader module includes a NFC reader/writer.

Compared to the related art, beneficial effects of the disclosure are below.

1. The hookah set (i.e., the intelligent temperature-controlled hookah set) in the disclosure uses the three-dimensional electric heating component to heat the tobacco bowl to prevent production of carbon monoxide during the heating process, thereby preventing harm to human and environments. Moreover, since electric heating is used, there is no need to frequently add or replace charcoal during a use of the hookah set, which can further improve safety and convenience of the hookah set. In addition, the temperature sensor inside the hookah set in the disclosure is used to monitor the temperature of the tobacco bowl. Feedback from the temperature sensor can better control the three-dimensional electric heating component, thereby achieving precise control of heating temperature, greatly avoiding an occurrence of tobacco overheating or insufficient heating. In this way, consistency of user experience can be effectively improved and differences in product experience caused by temperature fluctuations are avoided.
2. The three-dimensional electric heating component in the disclosure includes the heating sheet and the heating body. The heating body is placed above the tobacco bowl, in a same position as charcoal of the hookah set in the related art, which can simulate a heating effect of the hookah set in the related art to the greatest extent, making the hookah set in the disclosure as similar to the hookah set in the related art in experience as much as possible, thereby lowering an acceptance barrier for users. And the heating sheet is disposed on the side walls around the tobacco bowl, which can heat the tobacco bowl in all directions, making the tobacco bowl heated more uniform.

3. The hookah set in the disclosure can directly reflect usage of the hookah set by detecting the airflow changes at the inhalation channel through the airflow sensor, thereby better controlling electricity consumption of the hookah set according to a usage situation and saving meaningless energy consumption.

DETAILED DESCRIPTION OF EMBODIMENTS

Figure 1:
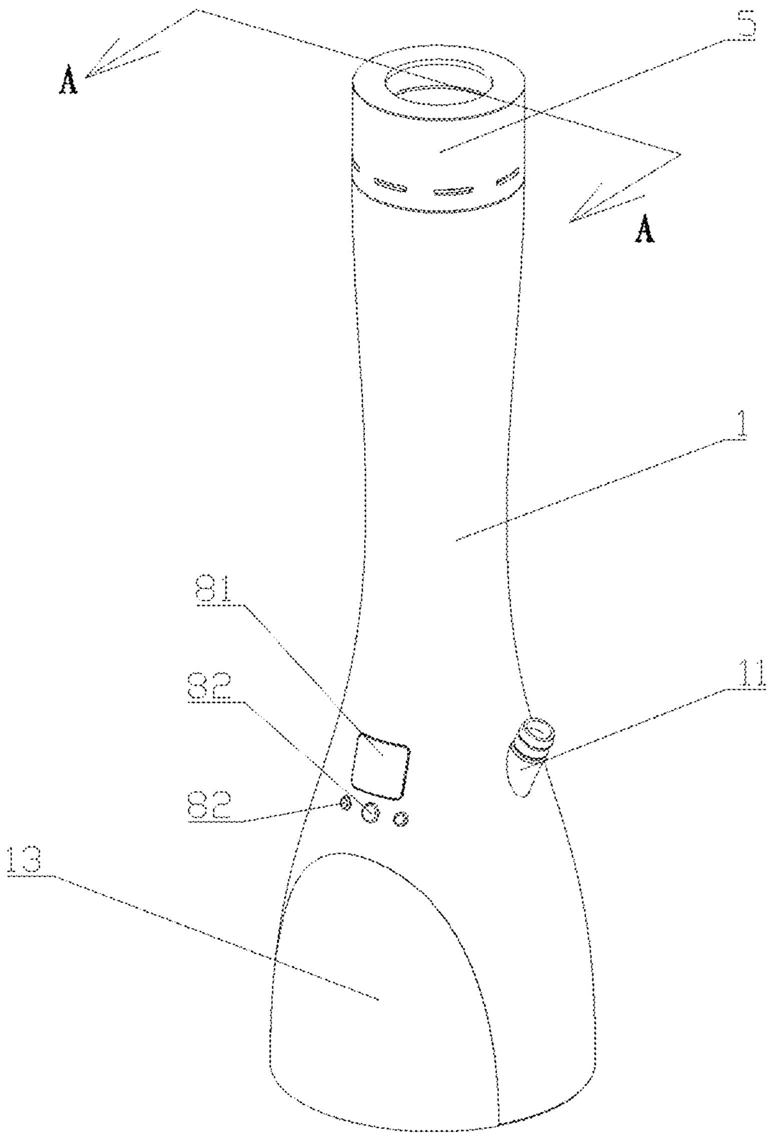
FIG. 1 illustrates a schematic diagram of an intelligent temperature-controlled hookah set of the disclosure.

Further detailed explanations of features and other related features of the disclosure through implementation examples are below, in order to facilitate the understanding of those skilled in the art.

Referring to FIG. 1 to FIG. 4, an intelligent temperature-controlled hookah set includes a hookah body 1. A bottom of the hookah body 1 is provided with a water tank 2, a top of the hookah body 1 is provided with a tobacco bowl 3, the water tank 2 is inserted with a smoke pipe 4 extending upward, a bottom of the tobacco bowl 3 defines a through hole 31 connected to an upper end opening of the smoke pipe 4, the hookah body 1 is provided with a three-dimensional electric heating component 5 therein configured to heat the tobacco bowl 3, and the hookah body 1 is provided with a temperature sensor 15 therein configured to monitor a temperature of the tobacco bowl 3.

As mentioned above, the hookah set (i.e., the intelligent temperature-controlled hookah set) in the disclosure uses the three-dimensional electric heating component 5 to heat the tobacco bowl 3 to prevent production of carbon monoxide during the heating process, thereby preventing harm to human and environments. Moreover, since electric heating is used, there is no need to frequently add or replace charcoal during a use of the hookah set, which can further improve safety and convenience of the hookah set. In addition, the temperature sensor 15 inside the hookah set in the disclosure is used to monitor the temperature of the tobacco bowl 3. Feedback from the temperature sensor 15 can better control the three-dimensional electric heating component 5, thereby achieving precise control of heating temperature, greatly avoiding an occurrence of tobacco overheating or insufficient heating. In this way, consistency of user experience can be effectively improved and differences in product experience caused by temperature fluctuations are avoided.

Figure 2:
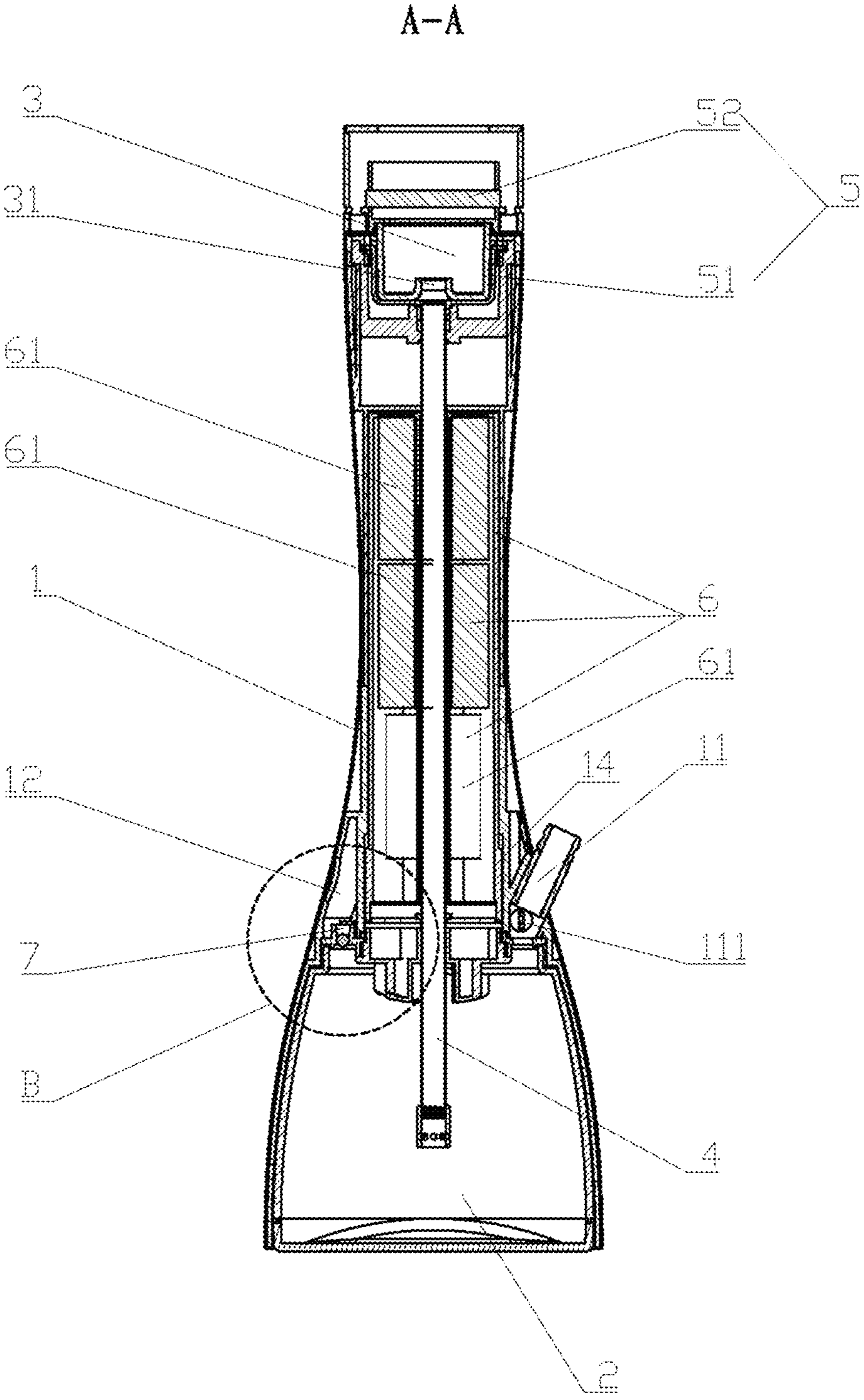
FIG. 2 illustrates a schematic sectional view of the intelligent temperature-controlled hookah set of the disclosure.
Figure 4:
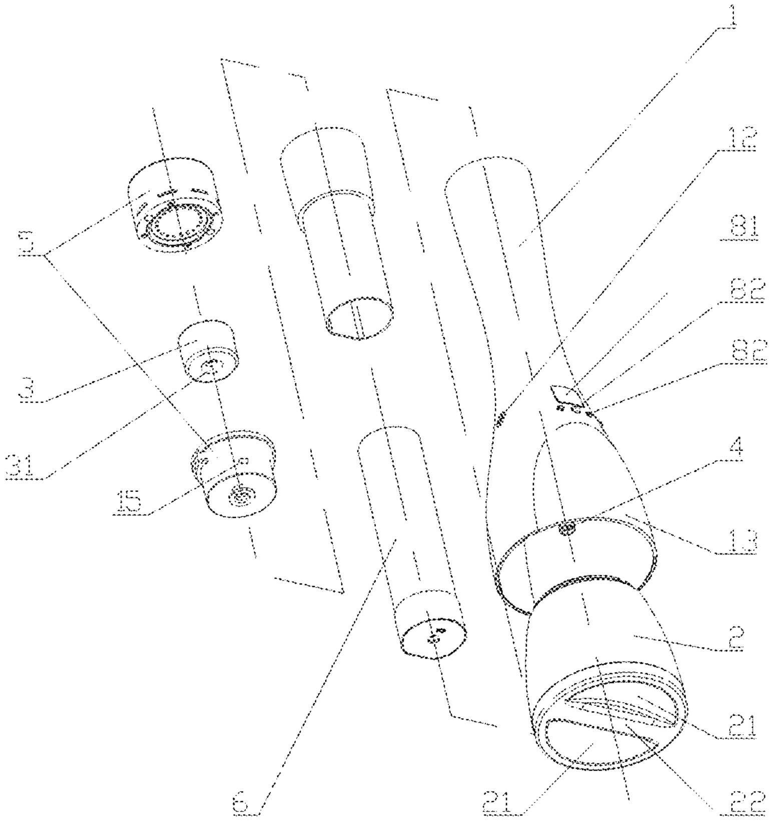
FIG. 4 illustrates a schematic exploded view of the intelligent temperature-controlled hookah set of the disclosure.

Referring to FIG. 1, FIG. 2 and FIG. 4, preferably, the three-dimensional electric heating component 5 includes a heating sheet 51 disposed around side walls of the tobacco bowl 3 and a heating body 52 disposed above the tobacco bowl 3.

As mentioned above, the three-dimensional electric heating component 5 in the disclosure includes the heating sheet 51 and the heating body 52. The heating body 52 is disposed above the tobacco bowl 3, in a same position as charcoal of the hookah set in the related art, which can simulate a heating effect of the hookah set in the related art to the greatest extent, making the hookah set in the disclosure as similar to the hookah set in the related art in experience as much as possible, thereby lowering an acceptance barrier for users. And the heating sheet 51 is disposed on the side walls around the tobacco bowl 3, which can heat the tobacco bowl 3 in all directions, making the tobacco bowl 3 heated more uniform.

Referring to FIG. 2, preferably, heating power of the heating body 52 is dynamically adjusted in a range of 0 W to 200 W. In this way, the users can fine-tune the heating power of the heating body 52 according to personal preferences, which can better adapt the hookah set to needs of different users and greatly improve applicability of the hookah set.

Referring to FIG. 2, the heating body 52 is a heating wire or a heating tube or a heating sheet.

Referring to FIG. 1, FIG. 2 and FIG. 4, preferably, the hookah body 1 is provided with a power component 6 therein between the water tank 2 and the tobacco bowl 3, and the power component 6 is configured to supply power to the hookah set. In this way, the hookah set in the disclosure can be powered by the power component 6 which is built-in when in use, without a need for additional power cables, which can make an application scenario of the hookah set in the disclosure consistent with the hookah set in the related art. Moreover, because the hookah set in the disclosure uses electric heating, the users do not need to carry a fire source with them like the hookah set in the related art, which can further improve convenience of use.

Referring to FIG. 2 and FIG. 4, preferably, the power component 6 is sleeved on a section of the smoke pipe 4 between the tobacco bowl 3 and the water tank 2. In this way, a residual temperature of the smoke pipe 4 can make the power component 6 work at a suitable temperature, avoiding a low temperature of the power component 6 from affecting its endurance.

Referring to FIG. 2 and FIG. 4, preferably, the power component 6 is installed with rechargeable batteries 61 therein which are detachable. In this way, when the power component 6 runs out of power, the users can choose to directly remove the rechargeable batteries 61 in the power component 6 and place fully charged rechargeable batteries 61 to complete quick energy replenishment. In addition, the users can also choose to connect the hookah set in the disclosure to a power supply to charge the rechargeable batteries 61 in the power component 6. In this way, the users can choose different energy replenishment methods based on actual usage scenarios, greatly improving flexibility of the hookah set in the disclosure.

Figure 5:
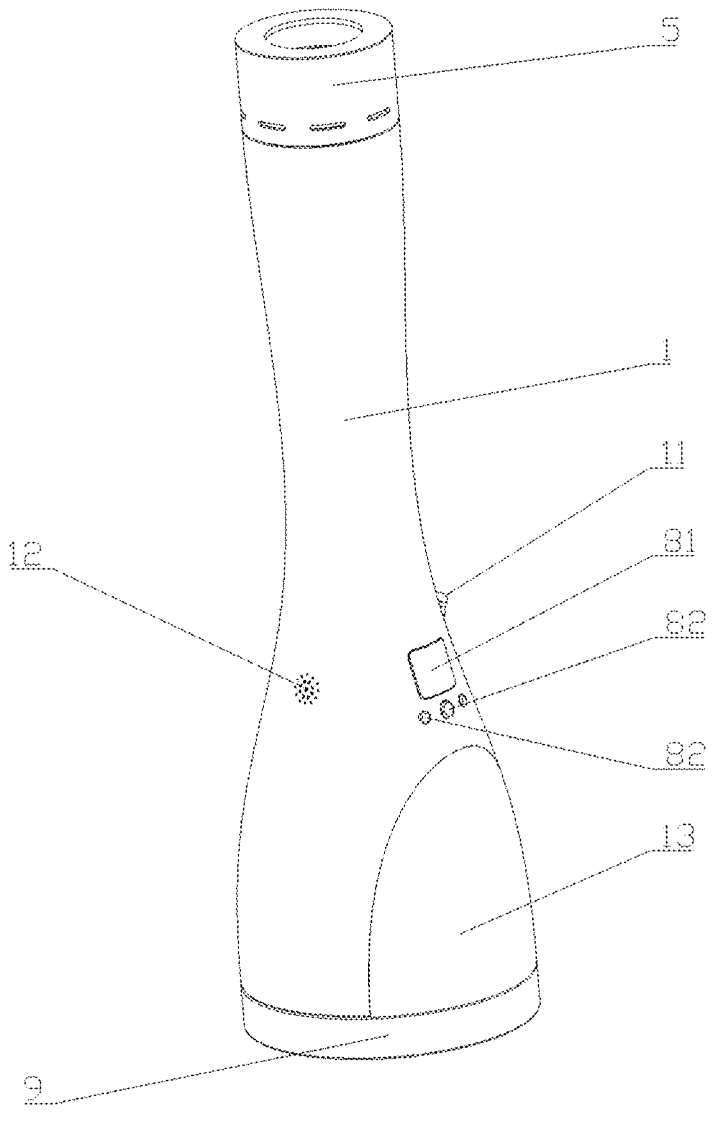
FIG. 5 illustrates a schematic diagram of the intelligent temperature-controlled hookah set including a power supply base of the disclosure.
Figure 6:
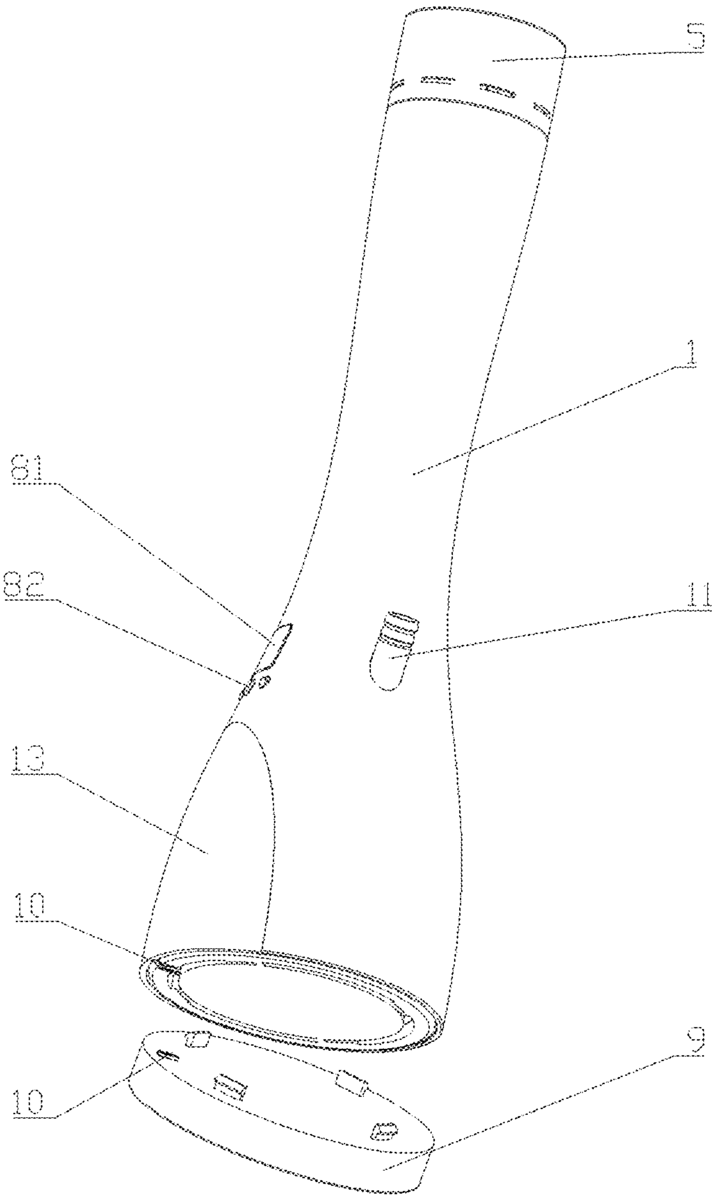
FIG. 6 illustrates another schematic diagram of the intelligent temperature-controlled hookah set including the power supply base of the disclosure.

Referring to FIG. 5 to FIG. 6, preferably, the hookah set further includes a power supply base 9 configured to place the hookah body 1 on the power supply base 9 and supply power to the hookah body 1.

As mentioned above, the hookah set in the disclosure can be powered by the power supply base 9. When using the hookah set, the hookah set can be placed on the power supply base 9 to provide power to the hookah set. The power supply base 9 also serves as the base for placing the hookah set. When the power supply base 9 runs out of power, the users only need to place the hookah set on another power supply base 9 which is fully charged to continue using the hookah set, and thus avoiding inability to use the hookah set due to waiting for charging, thereby improving the convenience of the use.

Referring to FIG. 5 and FIG. 6, preferably, each of the bottom of the hookah body 1 and a surface of the power supply base 9 is provided with a conductive contact 10. In this way, when the hookah body 1 is placed on the power supply base 9, the conductive contact 10 on the hookah body 1 contacts the conductive contact 10 on the power supply base 9 to achieve electrical connection, and thus the hookah set can be powered by the power supply base 9.

Preferably, the hookah set can be powered by the power component 6 alone, the power supply base 9 alone, or the power component 6 and the power supply base 9 together.

Referring to FIG. 1 and FIG. 2, a side wall of the hookah body 1 defines an inhalation channel 11 connected to the water tank 2, and a position of the inhalation channel 11 is higher than a lower end opening of the smoke pipe 4. In this way, the users can inhale gas flowing out from the lower end opening of the smoke pipe 4 and filtered by a base material in the water tank 2, via the inhalation channel 11.

Referring to FIG. 2, preferably, the hookah body 1 is provided with an airflow sensor 111 at the inhalation channel 11, the airflow sensor 111 is configured to sense airflow changes.

As mentioned above, the airflow sensor 111 disposed at the inhalation channel 11 can sense the airflow changes to judge whether the user is using the hookah set or not. Once the airflow sensor 111 detects that there is no airflow change for a certain period of time, the hookah set can temporarily reduce heating power of the three-dimensional electric heating component 5 and enter a standby mode, and thus the hookah set 3 maintains a certain standby temperature. This way, when the user continues to use the hookah set, the hookah set can quickly return to a normal temperature, thereby reducing standby power consumption. When the airflow sensor 111 detects no airflow change for a long time, the hookah set turns off the three-dimensional electric heating component 5 to avoid wasting energy. In this way, detecting the airflow changes at the inhalation channel 11 through the airflow sensor 111 can directly reflect usage of the hookah set, thereby better controlling electricity consumption of the hookah set according to a usage situation and saving meaningless energy consumption.

Referring to FIG. 2, preferably, the airflow sensor 111 is disposed at an end of the inhalation channel 11 close to the water tank 2. In this way, the airflow sensor 111 is disposed as far away from external airflow outside the inhalation channel 11 as possible to avoid interference from the external airflow on the airflow sensor 111, and thus allowing for a more accurate assessment of a usage state of the hookah set.

Figure 3:
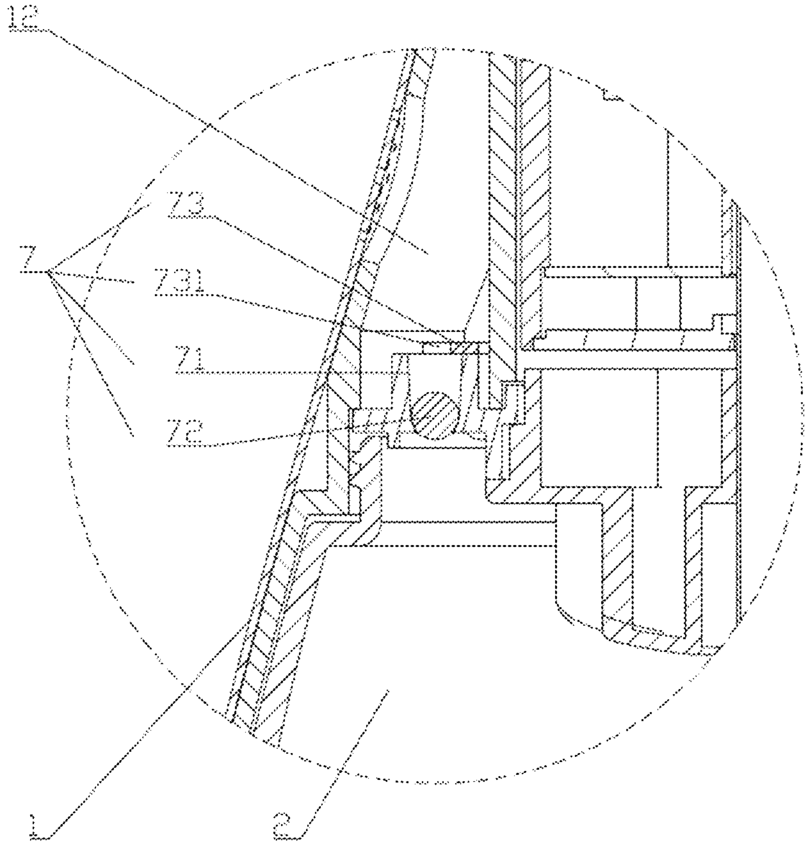
FIG. 3 illustrates a schematic sectional view of a pressure relief valve assembly of the disclosure.

Referring to FIG. 2 to FIG. 4, preferably, the side wall of the hookah body 1 is provided with an exhaust channel 12 connected to the water tank 2, a position of the exhaust channel 12 is higher than the lower end opening of the exhaust channel 12, and the hookah body 1 is provided with a pressure relief valve assembly 7 inside the exhaust channel 12.

As mentioned above, the hookah body 1 is provided with the exhaust channel 12 and the pressure relief valve assembly 7 inside the exhaust channel 12. When air pressure inside the hookah body 1 of the hookah set is too high, the pressure relief valve assembly 7 will automatically open to allow gas to be discharged through the exhaust channel 12, preventing danger caused by excessive air pressure.

Referring to FIG. 2 to FIG. 4, preferably, the pressure relief valve assembly 7 defines a pressure relief hole 71 inside the exhaust channel 12, a diameter of an upper opening of the pressure relief hole 71 is greater than a diameter of a lower opening of the pressure relief hole 71. A pressure relief ball 72 is disposed in the pressure relief hole 71, and a diameter of the pressure relief ball 72 is less than the diameter of the upper opening of the pressure relief hole 71 and greater than the diameter of the lower opening of the pressure relief hole 71. A baffle 73 is disposed at the upper opening of the pressure relief hole 71 to hinder release of the pressure relief ball 72, and the baffle 73 defines a gap 731 for the gas to pass through.

As mentioned above, when air pressure inside the exhaust channel 12 is less than or equal to external air pressure, the pressure relief ball 72 will block the pressure relief hole 71 by leaning against the lower end of the pressure relief hole 71 under influence of the air pressure and self-weight of the pressure relief ball 72. Once the air pressure inside the exhaust channel 12 exceeds the external air pressure, the pressure relief ball 72 will be pushed towards the upper end of the pressure relief hole 71 under an action of pressure difference, the gas can be discharged through the exhaust channel 12 to complete pressure relief. During exhaust, due to obstruction of the baffle 73, the pressure relief ball 72 cannot leave the pressure relief hole 71. When the pressure difference between the inside and outside of the exhaust channel 12 disappears, the pressure relief ball 72 will fall again and block the pressure relief hole 71.

Referring to FIG. 2 and FIG. 4, preferably, the water tank 2 is detachably connected to the bottom of the hookah body 1 through a threaded structure, that is, the water tank 2 is threadedly connected to the bottom of the hookah body 1. When the base material needs to be supplemented into the water tank 2, the water tank 2 can be quickly removed without affecting other parts, thereby improving the convenience of the use.

Referring to FIG. 4, preferably, a bottom of the water tank 2 defines multiple grooves 21, a grab part 22 is formed at the bottom of the water tank 2 between the grooves 21. The users can grab the grab part 22 to rotate the water tank 2 to remove the water tank 2 from the hookah body 1.

Referring to FIG. 1 and FIG. 4, preferably, the water tank 2 is made of transparent material, and a transparent window 13 is disposed on a bottom of the side wall of the hookah body 1. It is convenient for the users to view a state of the base material through the transparent window 13.

Referring to FIG. 1 and FIG. 4, preferably, the side wall of the hookah body 1 is provided with a display screen 81 configured to display the heating power of the three-dimensional electric heating component 5 and the temperature of the tobacco bowl 3, and the side wall of the hookah body 1 is further provided with operation buttons 82 configured to adjust the heating power of the three-dimensional electric heating component 5 and the temperature of the tobacco bowl 3. The users can directly view the heating power of the three-dimensional electric heating component 5 and the temperature of the tobacco bowl 3 through the display screen 81, and with the operation buttons 82, parameters can be accurately adjusted.

Referring to FIG. 1, preferably, the hookah body 1 is provided with a NFC reader module 14 therein configured to activate the hookah set and obtain a control permission.

Bundling a tobacco product with a NFC identification tool corresponding to the NFC reader module 14 ensures that the hookah set can only be activated for use with qualified tobacco products. This prevents the users from pairing the hookah set with substandard tobacco, which could degrade the user experience.

The disclosure protects the intelligent temperature-controlled hookah set, any technical solutions same as or similar to the technical solutions of the disclosure shall fall within the protection scope of the disclosure.

What is claimed is:

1. An intelligent temperature-controlled hookah set, comprising:

a hookah body (1), wherein a bottom of the hookah body (1) is provided with a water tank (2), a top of the hookah body (1) is provided with a tobacco bowl (3), the water tank (2) is inserted with a smoke pipe (4) extending upward, a bottom of the tobacco bowl (3) defines a through hole (31) connected to an upper end opening of the smoke pipe (4), the hookah body (1) is provided with a three-dimensional electric heating component (5) therein configured to heat the tobacco bowl (3), and the hookah body (1) is provided with a temperature sensor (15) therein configured to monitor a temperature of the tobacco bowl (3);

wherein a side wall of the hookah body (1) defines an inhalation channel (11) connected to the water tank (2), and a position of the inhalation channel (11) is higher than a lower end opening of the smoke pipe (4); and the hookah body (1) is provided with an airflow sensor (111) configured to sense airflow changes at the inhalation channel (11), and when the airflow sensor (111) detects that there is no airflow change for a first period of time, heating power of the three-dimensional electric heating component (5) is controlled to be reduced, or when the airflow sensor (111) detects that there is no airflow change for a second period of time which is longer than the first period of time, the three-dimensional electric heating component (5) is controlled to be turned off; and wherein the hookah body (1) is provided with a power component (6) therein between the water tank (2) and the tobacco bowl (3), the power component (6) is located directly below the tobacco bowl (3) and directly above the water tank (2), and the power component (6) is configured to supply power to the intelligent temperature-controlled hookah set.

2. The intelligent temperature-controlled hookah set as claimed in claim 1, wherein the three-dimensional electric heating component (5) comprises a heating sheet (51) disposed around side walls of the tobacco bowl (3) and a heating body (52) disposed above the tobacco bowl (3); the heating body (52) is spaced apart from the heating sheet (51); and a part of the bottom of the tobacco bowl (3) extends upward to define the through hole (31), the heating sheet (51) extends from the side walls of the tobacco bowl (3) to the bottom of the tobacco bowl (3) and extends from the bottom of the tobacco bowl (3) downward to define a hole corresponding to the through hole (31), which is connected to the smoke pipe (4).

3. The intelligent temperature-controlled hookah set as claimed in claim 2, wherein heating power of the heating body (52) is dynamically adjusted in a range of 0 watt (W) to 200 W.

4. The intelligent temperature-controlled hookah set as claimed in claim 2, wherein the heating body (52) is one of a heating wire, a heating tube and a heating sheet.

5. The intelligent temperature-controlled hookah set as claimed in claim 1, wherein the power supply component (6) is sleeved on a section of the smoke pipe (4) between the tobacco bowl (3) and the water tank (2).

6. The intelligent temperature-controlled hookah set as claimed in claim 1, wherein the power supply component (6) is installed with rechargeable batteries (61) therein which are detachable, and the rechargeable batteries (61) are arranged along a length of the smoke pipe (4).

7. The intelligent temperature-controlled hookah set as claimed in claim 1, comprising: a power supply base (9) configured to place the hookah body (1) thereon and supply power to the hookah body (1).

8. The intelligent temperature-controlled hookah set as claimed in claim 1, wherein the airflow sensor (111) is disposed at an end of the inhalation channel (11) close to the water tank (2).

9. The intelligent temperature-controlled hookah set as claimed in claim 1, wherein the side wall of the hookah body (1) is provided with a display screen (81) configured to display the heating power of the three-dimensional electric heating component (5) and the temperature of the tobacco bowl (3), and the side wall of the hookah body (1) is further provided with operation buttons (82) configured to adjust the heating power of the three-dimensional electric heating component (5) and the temperature of the tobacco bowl (3).

10. The intelligent temperature-controlled hookah set as claimed in claim 1, wherein the hookah body (1) is provided with a near field communication (NFC) reader module (14) therein configured to activate the intelligent temperature-controlled hookah set in response to a tobacco product being a target tobacco product and obtain a control permission.

11. The intelligent temperature-controlled hookah set as claimed in claim 1, wherein a bottom of the water tank (2) defines two grooves (21), a grab part (22) is formed at the bottom of the water tank (2) and between the two grooves (21), and the grab part (22) is configured to be grabbed by a user to rotate the water tank (2) to remove the water tank (2) from the hookah body (1).

12. The intelligent temperature-controlled hookah set as claimed in claim 1, wherein the hookah body (1) defines an exhaust channel (12) therein located at a side of the hookah body (1) facing away from the inhalation channel (11), the hookah body (1) is provided with a pressure relief valve assembly (7) inside the exhaust channel (12), and the pressure relief valve assembly (7) comprises:

a pressure relief hole (71) inside the hookah body (1) and connected with the exhaust channel (12), wherein the pressure relief hole (71) has an upper opening and a bottom opening, and a diameter of the upper opening is larger than that of the bottom opening;

a pressure relief ball (72) inside the hookah body (1) and in the pressure relief hole (71);

a baffle (73) inside the hookah body (1) and at the upper opening of the pressure relief hole (71); and a gap (731) defined on the baffle (73);

wherein when air pressure inside the exhaust channel (12) is less than or equal to external air pressure, the pressure relief ball (72) blocks the bottom opening of the pressure relief hole (71), when the air pressure inside the exhaust channel (12) exceeds the external air pressure, the pressure relief ball (72) is pushed towards the upper opening of the pressure relief hole (71) to make gas be discharged through the exhaust channel (12), and the baffle (73) blocks the pressure relief ball (72) to leave the pressure relief hole (71).

13. An intelligent temperature-controlled hookah set, comprising: a hookah body (1), wherein a bottom of the hookah body (1) is provided with a water tank (2), a top of the hookah body (1) is provided with a tobacco bowl (3), the water tank (2) is inserted with a smoke pipe (4) extending upward, a bottom of the tobacco bowl (3) defines a through hole (31) connected to an upper end opening of the smoke pipe (4), the hookah body (1) is provided with a three-dimensional electric heating component (5) therein configured to heat the tobacco bowl (3), and the three-dimensional electric heating component (5) comprises a heating body (52) disposed above the tobacco bowl (3); and wherein the three-dimensional electric heating component (5) further comprises a heating sheet (51) disposed around side walls of the tobacco bowl (3), and the heating body (52) disposed above the tobacco bowl (3) is spaced apart from the heating sheet (51) disposed around side walls of the tobacco bowl (3); and a part of the bottom of the tobacco bowl (3) extends upward to define the through hole (31), and the heating sheet (51) extends from the side walls of the tobacco bowl (3) to the bottom of the tobacco bowl (3) and further extends from the bottom of the tobacco bowl (3) downward to define a hole corresponding to the through hole (31), which is connected to the smoke pipe (4).

14. The intelligent temperature-controlled hookah set as claimed in claim 13, wherein the hookah body (1) is provided with a temperature sensor (15) therein configured to monitor a temperature of the tobacco bowl (3).

15. The intelligent temperature-controlled hookah set as claimed in claim 14, wherein a bottom of the water tank (2) defines two grooves (21), a grab part (22) is formed at the bottom of the water tank (2) and between the two grooves (21), and the grab part (22) is configured to be grabbed by a user to rotate the water tank (2) to remove the water tank (2) from the hookah body (1).

16. The intelligent temperature-controlled hookah set as claimed in claim 13, wherein a side wall of the hookah body (1) defines an inhalation channel (11) connected to the water tank (2), and a position of the inhalation channel (11) is higher than a lower end opening of the smoke pipe (4); and the hookah body (1) is provided with an airflow sensor (111) at the inhalation channel (11), and when the airflow sensor (111) detects that there is no airflow change for a first period of time, heating power of the three-dimensional electric heating component (5) is reduced, and when the airflow sensor (111) detects that there is no airflow change for a second period of time which is longer than the first period of time, the three-dimensional electric heating component (5) is turned off.

17. An intelligent temperature-controlled hookah set, comprising: a hookah body (1), wherein a bottom of the hookah body (1) is provided with a water tank (2), a top of the hookah body (1) is provided with a tobacco bowl (3), the water tank (2) is inserted with a smoke pipe (4) extending upward, a bottom of the tobacco bowl (3) defines a through hole (31) connected to an upper end opening of the smoke pipe (4), and the hookah body (1) is provided with a NFC reader module (14) therein;

wherein the NFC reader module (14) is configured to read tobacco product information from a NFC identification tool corresponding to the NFC reader module (14), and in response to the tobacco product information being target tobacco product information, activate the intelligent temperature-controlled hookah set for use; and wherein the heating body (52) disposed above the tobacco bowl (3) is spaced apart from the heating sheet (51) disposed around side walls of the tobacco bowl (3); and a part of the bottom of the tobacco bowl (3) extends upward to define the through hole (31), and the heating sheet (51) extends from the side walls of the tobacco bowl (3) to the bottom of the tobacco bowl (3) and further extends from the bottom of the tobacco bowl (3) downward to define a hole corresponding to the through hole 31), which is connected to the smoke pipe 4).

18. The intelligent temperature-controlled hookah set as claimed in claim 17, wherein the hookah body (1) defines an inhalation channel (11) and an exhaust channel (12), the hookah body (1) is provided with an airflow sensor (111) inside the inhalation channel (11), the airflow sensor (111) is configured to sense airflow changes to control the intelligent temperature-controlled hookah set in different modes; and the hookah body (1) is provided with a pressure relief valve assembly (7) inside the exhaust channel (12) configured to relieve pressure when air pressure in the water tank (2) is higher than external air pressure;

wherein the hookah body (1) is provided with a three-dimensional electric heating component (5) therein configured to heat the tobacco bowl (3), when the airflow sensor (111) detects that there is no airflow change for a first period of time, heating power of the three-dimensional electric heating component (5) is controlled to be reduced, and the intelligent temperature-controlled hookah set is in a standby mode, when the airflow sensor (111) detects that there is no airflow change for a second period of time which is longer than the first period of time, the three-dimensional electric heating component (5) is controlled to be turned off; and wherein the pressure relief valve assembly (7) comprises:

a pressure relief hole (71) inside the hookah body (1) and connected with the exhaust channel (12);

a pressure relief ball (72) disposed inside the hookah body (1) and in the pressure relief hole (71);

a baffle (73) disposed inside the hookah body (1) and at an upper opening of the pressure relief hole (71); and a gap (731) defined on the baffle (73);

wherein when air pressure inside the exhaust channel (12) is less than or equal to the external air pressure, the pressure relief ball (72) blocks a bottom opening of the pressure relief hole (71), when the air pressure inside the exhaust channel (12) exceeds the external air pressure, the pressure relief ball (72) is pushed towards the upper opening of the pressure relief hole (71) to make gas be discharged through the exhaust channel (12), and the baffle (73) blocks the pressure relief ball (72) to leave the pressure relief hole (71).

* * * * *